US 10,547,504 B2

(12) United States Patent
Wang et al.

(10) Patent No.: US 10,547,504 B2
(45) Date of Patent: Jan. 28, 2020

(54) METHOD AND SYSTEM FOR MEASURING QUALITY OF SERVICE RUNNING ON TERMINAL, AND DEVICE

(71) Applicant: Huawei Technologies Co., Ltd., Shenzhen (CN)

(72) Inventors: Yining Wang, Shenzhen (CN); Cheng Cao, Shenzhen (CN); Zhiwei Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 15/858,222

(22) Filed: Dec. 29, 2017

(65) Prior Publication Data
US 2018/0124629 A1    May 3, 2018

Related U.S. Application Data

(63) Continuation of application No. PCT/CN2016/084883, filed on Jun. 6, 2016.

(30) Foreign Application Priority Data

Jun. 30, 2015   (CN) .......................... 2015 1 0386057

(51) Int. Cl.
*H04L 12/24*          (2006.01)
*H04L 12/26*          (2006.01)
(Continued)

(52) U.S. Cl.
CPC .......... *H04L 41/0803* (2013.01); *H04L 43/10* (2013.01); *H04W 24/02* (2013.01); *H04W 24/08* (2013.01)

(58) Field of Classification Search
CPC ......... H04L 12/56; H04L 43/04; H04L 43/08; H04L 43/12; H04L 45/00; H04L 45/302;
(Continued)

(56) References Cited

U.S. PATENT DOCUMENTS 6,647,265 B1   11/2003   Olofsson et al.
9,641,411 B1 *  5/2017   Rogan ................ G06Q 30/0202
(Continued)

FOREIGN PATENT DOCUMENTS

CN    1561078 A    1/2005
CN    2694654 Y    4/2005
(Continued)

OTHER PUBLICATIONS

Almes, G., et al., "A One-way Delay Metric for IPPM," RFC 2679, Sep. 1999, 20 pages.
(Continued)

*Primary Examiner* — Joshua Kading
(74) *Attorney, Agent, or Firm* — Conley Rose, P.C.

(57) ABSTRACT

A method for measuring quality of a service running on a terminal includes sending, by the terminal, a measurement request message to a network management device, where the measurement request message requests the network management device to measure the quality of the service, receiving, by the terminal, measurement configuration information from the network management device in response to the measurement request message, coloring a packet of a service stream within a preset measurement period according to the measurement configuration information to obtain a colored packet, and sending, by the terminal, at least one of quantity information or time stamp information of the colored packet to the network management device. Hence, the quality of the service running on the terminal is comprehensively measured.

12 Claims, 5 Drawing Sheets

A terminal sends a measurement request message to a network management device, where the measurement request message is used to request the network management device to measure quality of a service ⟶ 201

The terminal receives measurement configuration information sent by the network management device in response to the measurement request message, and colors a packet of a service stream within a preset measurement period according to the measurement configuration information to obtain a colored packet, where the service stream is a data stream of the service, and the measurement configuration information includes the measurement period ⟶ 202

The terminal sends at least one of quantity information or time stamp information of the colored packet to the network management device such that the network management device determines the quality of the service according to the at least one of the quantity information or the time stamp information of the colored packet ⟶ 203

(51) Int. Cl.
*H04W 24/08* (2009.01)
*H04W 24/02* (2009.01)

(58) Field of Classification Search
CPC . H04L 41/5009; H04L 47/822; H04L 47/826; H04L 2012/5652; H04W 40/02; H04W 24/04; H04W 24/08
See application file for complete search history.

(56) References Cited

U.S. PATENT DOCUMENTS

| | | | |
|---|---|---|---|
| 2004/0082338 | A1 | 4/2004 | Norrgard et al. |
| 2005/0041584 | A1 | 2/2005 | Lau et al. |
| 2006/0218271 | A1* | 9/2006 | Kasslin ............... H04L 43/06 709/224 |
| 2009/0011768 | A1* | 1/2009 | Seok ............... H04L 41/5003 455/450 |
| 2009/0040942 | A1 | 2/2009 | Yang |
| 2010/0128694 | A1 | 5/2010 | Choi-Grogan |
| 2010/0128697 | A1 | 5/2010 | Choi-Grogan |
| 2011/0007648 | A1 | 1/2011 | Liu et al. |
| 2016/0006634 | A1 | 1/2016 | Li et al. |
| 2018/0077032 | A1* | 3/2018 | Park ............... H04L 41/5067 |

FOREIGN PATENT DOCUMENTS

| | | | |
|---|---|---|---|
| CN | 1620791 | A | 5/2005 |
| CN | 1777301 | A | 5/2006 |
| CN | 1874563 | A | 12/2006 |
| CN | 101056217 | A | 10/2007 |
| CN | 101056219 | A | 10/2007 |
| CN | 101166122 | A | 4/2008 |
| CN | 100401807 | C | 7/2008 |
| CN | 100480711 | C | 4/2009 |
| CN | 101404597 | A | 4/2009 |
| CN | 101551871 | A | 10/2009 |
| CN | 101577631 | A | 11/2009 |
| CN | 101674204 | A | 3/2010 |
| CN | 101819763 | A | 9/2010 |
| CN | 101957887 | A | 1/2011 |
| CN | 102056195 | A | 5/2011 |
| CN | 202736145 | U | 2/2013 |
| CN | 103096363 | A | 5/2013 |
| CN | 103152223 | A | 6/2013 |
| CN | 103746874 | A | 4/2014 |
| CN | 104378220 | A | 2/2015 |
| CN | 105072629 | A | 11/2015 |
| EP | 3035597 | A1 | 6/2016 |
| WO | 2007121686 | A1 | 11/2007 |

OTHER PUBLICATIONS

Demichelis, C., "IP Packet Delay Variation Metric for IP Performance Metrics (IPPM)," RFC 3393, Nov. 2002, 21 pages.
Wikipedia, "traceroute," XP055185688, Feb. 26, 2014, 6 pages.
Foreign Communication From a Counterpart Application, European Application No. 16817114.8, European Office Action dated Oct. 25, 2018, 15 pages.
Lizhi, P., et al.,"Traffic Labeller: Collecting Internet traffic samples with accurate application information," XP011549421, Network Technology and Application, China Communications, Jan. 2014, pp. 69-78.
Chen, M., Ed., et al., "IP Flow Performance Measurement Framework," XP015104790, draft-chen-ippm-coloring-based-ipfpm-framework-03, Feb. 17, 2015, 15 pages.
Capello, A., et al., "A packet based method for passive performance monitoring," XP015105105, draft-tempia-ippm-p3m-00.txt, Mar. 2015, 21 pages.
Raisanen, V., "Measurement-Based IP Transport Resource Manager Demonstrator," XP055153152, LNCS, Jan. 2001, pp. 127-136.
Soldani, D., "Means and Methods for Collecting and Analyzing QoE Measurements in Wireless Networks," XP058152899, Proceedings of the International Symposium on a World of Wireless, Mobile and Multimedia Networks, Jun. 26, 2006, 5 pages.
Foreign Communication From a Counterpart Application, European Application No. 16817114.8, Extended European Search Report dated Apr. 6, 2018, 12 pages.
Machine Translation and Abstract of Chinese Publication No. CN1561078, Jan. 5, 2005, 12 pages.
Machine Translation and Abstract of Chinese Publication No. CN1777301, May 24, 2006, 22 pages.
Translation and Abstract of Chinese Publication No. CN1874563, Dec. 6, 2006, 8 pages.
Machine Translation and Abstract of Chinese Publication No. CN2694654, Apr. 20, 2005 8 pages.
Translation and Abstract of Chinese Publication No. CN100401807, Jul. 9, 2008, 19 pages.
Machine Translation and Abstract of Chinese Publication No. CN101056219, Oct. 17, 2007, 13 pages.
Machine Translation and Abstract of Chinese Publication No. CN101166122, Apr. 23, 2008, 9 pages.
Machine Translation and Abstract of Chinese Publication No. CN101404597, Apr. 8, 2009, 22 pages.
Machine Translation and Abstract of Chinese Publication No. CN101551871, Oct. 7, 2009, 13 pages.
Machine Translation and Abstract of Chinese Publication No. CN101674204, Mar. 17, 2010, 22 pages.
Machine Translation and Abstract of Chinese Publication No. CN101819763, Sep. 1, 2010, 11 pages.
Machine Translation and Abstract of Chinese Publication No. CN101957887, Jan. 26, 2011, 10 pages.
Machine Translation and Abstract of Chinese Publication No. CN102056195, May 11, 2011, 16 pages.
Machine Translation and Abstract of Chinese Publication No. CN103096363, May 8, 2013, 27 pages.
Machine Translation and Abstract of Chinese Publication No. CN103746874, Apr. 23, 2014, 33 pages.
Machine Translation and Abstract of Chinese Publication No. CN105072629, Nov. 18, 2015, 29 pages.
Machine Translation and Abstract of Chinese Publication No. CN202736145, Feb. 13, 2013, 8 pages.
Bradner, S., et al.,"Benchmarking Methodology for Network Interconnect Devices," RFC 2544, Mar. 1999, 26 pages.
Frost, D., et al. "A Packet Loss and Delay Measurement Profile for MPLS-Based Transport Networks," RFC 6375, Sep. 2011, 5 pages.
Frost, D., et al.,"Packet Loss and Delay Measurement for MPLS Networks," RFC 6374, Sep. 2011, 52 pages.
"Series G: Transmission Systems and Media, Digital Systems and Networks; Packet over Transport aspects—Ethernet over Transport aspects; Series Y: Global Information Infrastructure, Internet Protocol Aspects and next-Generation Networks; Internet protocol aspects—Operation,administration and maintenance; OAM functions and mechanisms for Ethernet based networks", ITU-T G.8013/Y.1731, Nov. 2013, 99 pages.
Foreign Communication From a Counterpart Application, Chinese Application No. 201510386057.4, Chinese Office Action dated Dec. 13, 2017, 9 pages.
Foreign Communication From a Counterpart Application, PCT Application No. PCT/CN2016/084883, English Translation of International Search Report dated Aug. 29, 2016, 2 pages.
Foreign Communication From a Counterpart Application, PCT Application No. PCT/CN2016/084883, English Translation of Written Opinion dated Aug. 29, 2016, 7 pages.

* cited by examiner

FIG. 1

201 A terminal sends a measurement request message to a network management device, where the measurement request message is used to request the network management device to measure quality of a service 202 The terminal receives measurement configuration information sent by the network management device in response to the measurement request message, and colors a packet of a service stream within a preset measurement period according to the measurement configuration information to obtain a colored packet, where the service stream is a data stream of the service, and the measurement configuration information includes the measurement period 203 The terminal sends at least one of quantity information or time stamp information of the colored packet to the network management device such that the network management device determines the quality of the service according to the at least one of the quantity information or the time stamp information of the colored packet

FIG. 2

| 0 | | | 15 16 | | 31 |
|---|---|---|---|---|---|
| 4-bit version | Internet header length | 8-bit TOS | Total length (a quantity of bits) | | |
| Identifier | | | 3-bit identifier | Fragment offset | |
| Time to live | | Protocol | Internet header checksum | | |
| Source IP address | | | | | |
| Destination IP address | | | | | |
| Option | | | | Reserved 8 bits | |

| | |
|---|---|
| Ethernet | 16 bytes |
| LDP/TE LSP | 4 bytes |
| BGP LSP | 4 bytes |
| VPN | 4 bytes |
| Ethernet | 16 bytes |
| IP-2 | 20 bytes |
| UDP | 8 bytes |
| GTP | X bytes |
| IP-1 | 20 bytes |
| UDP | 8 bytes |

METHOD AND SYSTEM FOR MEASURING QUALITY OF SERVICE RUNNING ON TERMINAL, AND DEVICE

CROSS-REFERENCE TO RELATED APPLICATIONS

This application is a continuation of International Patent Application No. PCT/CN2016/084883 filed on Jun. 6, 2016, which claims priority to Chinese Patent Application No. 201510386057.4 filed on Jun. 30, 2015, both of which are hereby incorporated by reference in their entireties.

TECHNICAL FIELD

Embodiments of the present disclosure relate to the communications technologies, and in particular, to a method and system for measuring quality of a service running on a terminal, and a device.

BACKGROUND

Nowadays, rapid development of network technologies provides users with great convenience and value, and the users also have higher requirements on networks. Therefore, network operators pay increasing attention on experience of end users. The core for the network operators to meet increasingly demanding requirements of the users is to provide better network transmission quality. Therefore, how to discover and locate, through measurement, a problem that exists in a network becomes particularly important.

In a process of implementing the present disclosure, the inventor finds that at least the following problem exists in other approaches. In Internet Protocol (IP) flow performance measurement (FPM) in the other approaches, quality of services of only a wireless tunnel and a bearer network tunnel can be measured but measurement cannot be initiated on a terminal side, that is, a capability of measuring quality of a service applied to a terminal is lacking in the other approaches.

SUMMARY

Embodiments of the present disclosure provide a method and system for measuring quality of a service running on a terminal, and a device, to measure quality of a service running on a terminal.

According to a first aspect, an embodiment of the present disclosure provides a method for measuring quality of a service running on a terminal, including sending, by the terminal, a measurement request message to a network management device, where the measurement request message is used to request the network management device to measure the quality of the service, receiving, by the terminal, measurement configuration information sent by the network management device in response to the measurement request message, and coloring a packet of a service stream within a preset measurement period according to the measurement configuration information to obtain a colored packet, where the service stream is a data stream of the service, and the measurement configuration information includes the measurement period, and sending, by the terminal, at least one of quantity information or time stamp information of the colored packet to the network management device such that the network management device determines the quality of the service according to the at least one of the quantity information of the time stamp information of the colored packet.

With reference to the first aspect, in a first possible implementation manner of the first aspect, coloring a packet of a service stream within a preset measurement period according to the measurement configuration information includes coloring the packet of the service stream within the measurement period according to a preset coloring rule, where the preset coloring rule includes coloring a bit of at least one field of a type of service (TOS) field and a flag field of the packet.

With reference to the first aspect or the first possible implementation manner of the first aspect, in a second possible implementation manner of the first aspect, the measurement request message is an IP FPM request message.

With reference to the first aspect or the first possible implementation manner of the first aspect, in a third possible implementation manner of the first aspect, before sending, by the terminal, a measurement request message to a network management device, the method further includes obtaining, by the terminal, a public IP address of the network management device from a domain name server (DNS), where sending, by the terminal, a measurement request message to a network management device includes sending, by the terminal, the measurement request message to the network management device according to the public IP address.

According to a second aspect, an embodiment of the present disclosure provides a method for measuring quality of a service running on a terminal, including receiving, by a network management device, a measurement request message sent by the terminal, determining, by the network management device, a transmission path of a service stream according to the measurement request message, and sending measurement configuration information to each node included in the transmission path, where the service stream is a data stream of the service, and receiving, by the network management device, at least one of quantity information or time stamp information of a colored packet sent by each node in the transmission path, and determining the quality of the service according to the at least one of the quantity information of the time stamp information of the colored packet sent by each node, where the colored packet is a packet obtained after a packet of the service stream is colored within a preset measurement period by the terminal according to the measurement configuration information.

With reference to the second aspect, in a first possible implementation manner of the second aspect, determining, by the network management device, a transmission path of a service stream according to the measurement request message includes sending, by the network management device, a probe packet according to the measurement request message such that each node in a network obtains the probe packet and determines a hop count of the probe packet according to 5-tuple information of the measurement request message, where the probe packet carries the 5-tuple information of the measurement request message, and determining, by the network management device, the transmission path according to node information and hop count information that are reported by each port.

With reference to the second aspect or the first possible implementation manner of the second aspect, in a second possible implementation manner of the second aspect, determining the quality of the service according to the at least one of the quantity information of the time stamp information of the colored packet sent by each node includes determining, according to the quantity information of the colored packet sent by each node, packet loss rate information of the colored packet at each hop in the transmission path of the service stream, or determining, according to the time stamp information of the colored packet sent by each node, delay information and/or delay variation information of the colored packet at each hop in the transmission path of the service stream.

According to a third aspect, an embodiment of the present disclosure provides a method for measuring quality of a service running on a terminal, including receiving measurement configuration information sent by a network management device and a colored packet sent by the terminal, where the colored packet is a packet obtained after a packet of a service stream is colored within a preset measurement period by the terminal according to the measurement configuration information, and the service stream is a data stream of the service, and collecting statistics of a quantity and time stamps of the colored packets received within the measurement period, and sending, to the network management device, at least one of quantity information or time stamp information of the colored packet that are obtained through statistics such that the network management device determines the quality of the service according to the at least one of the quantity information of the time stamp information of the colored packet.

According to a fourth aspect, an embodiment of the present disclosure provides a terminal, including a sending module configured to send a measurement request message to a network management device, where the measurement request message is used to request the network management device to measure quality of a service, a receiving module configured to receive measurement configuration information sent by the network management device in response to the measurement request message, and a coloring module configured to color a packet of a service stream within a preset measurement period according to the measurement configuration information to obtain a colored packet, where the service stream is a data stream of the service, and the measurement configuration information includes the measurement period, where the sending module is further configured to send at least one of quantity information or time stamp information of the colored packet to the network management device such that the network management device determines the quality of the service according to the at least one of the quantity information of the time stamp information of the colored packet.

With reference to the fourth aspect, in a first possible implementation manner of the fourth aspect, the coloring module is further configured to color the packet of the service stream within the measurement period according to a preset coloring rule, where the preset coloring rule includes coloring a bit of at least one field of a TOS field and a flag field of the packet.

With reference to the fourth aspect or the first possible implementation manner of the fourth aspect, in a second possible implementation manner of the fourth aspect, the measurement request message is an IP FPM request message.

With reference to the fourth aspect or the first possible implementation manner of the fourth aspect, in a third possible implementation manner of the fourth aspect, the terminal further includes an obtaining module configured to obtain a public IP address of the network management device from a DNS, where the sending module is further configured to send the measurement request message to the network management device according to the public IP address.

According to a fifth aspect, an embodiment of the present disclosure provides a network management device, including a receiving module configured to receive a measurement request message sent by a terminal, a processing module configured to determine a transmission path of a service stream according to the measurement request message, where the service stream is a data stream of the service, and a sending module configured to send measurement configuration information to each node included in the transmission path, where the receiving module is further configured to receive at least one of quantity information or time stamp information of a colored packet sent by each node in the transmission path, and the processing module is further configured to determine the quality of the service according to the at least one of the quantity information of the time stamp information of the colored packet sent by each node, where the colored packet is a packet obtained after a packet of the service stream is colored within a preset measurement period by the terminal according to the measurement configuration information.

With reference to the fifth aspect, in a first possible implementation manner of the fifth aspect, the processing module is further configured to send a probe packet according to the measurement request message such that each node in a network obtains the probe packet and determines a hop count of the probe packet according to 5-tuple information of the measurement request message, where the probe packet carries the 5-tuple information of the measurement request message, and determine the transmission path according to node information and hop count information that are reported by each port.

With reference to the fifth aspect or the first possible implementation manner of the fifth aspect, in a second possible implementation manner of the fifth aspect, the processing module is further configured to determine, according to the quantity information of the colored packet sent by each node, packet loss rate information of the colored packet at each hop in the transmission path of the service stream, or determine, according to the time stamp information of the colored packet sent by each node, delay information and/or delay variation information of the colored packet at each hop in the transmission path of the service stream.

According to a sixth aspect, an embodiment of the present disclosure provides a network element device, including a receiving module configured to receive measurement configuration information sent by a network management device and a colored packet sent by a terminal, where the colored packet is a packet obtained after a packet of a service stream is colored within a preset measurement period by the terminal according to the measurement configuration information, the service stream is a data stream of the service, and the measurement configuration information includes the measurement period, a processing module configured to collect statistics of a quantity and time stamps of the colored packets received within the measurement period, and a sending module configured to send, to the network management device, at least one of quantity information or time stamp information of the colored packet that are obtained through statistics such that the network management device determines the quality of the service according to the at least one of the quantity information of the time stamp information of the colored packet.

According to a seventh aspect, an embodiment of the present disclosure provides a system for measuring quality of a service running on a terminal, including any terminal in the fourth aspect, any network management device in the fifth aspect, and any network element device in the sixth aspect.

According to the method and system for measuring quality of a service running on a terminal, and the device provided in the embodiments of the present disclosure, a terminal sends a measurement request message to a network management device, to request to measure quality of a specified service, the network management device configures a measurement parameter based on the request of the terminal, the terminal colors and reports colored packet information according to configuration information delivered by network management system, and the network management device finally comprehensively measures, according to the colored packet information reported by the terminal, the quality of the service running on the terminal.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
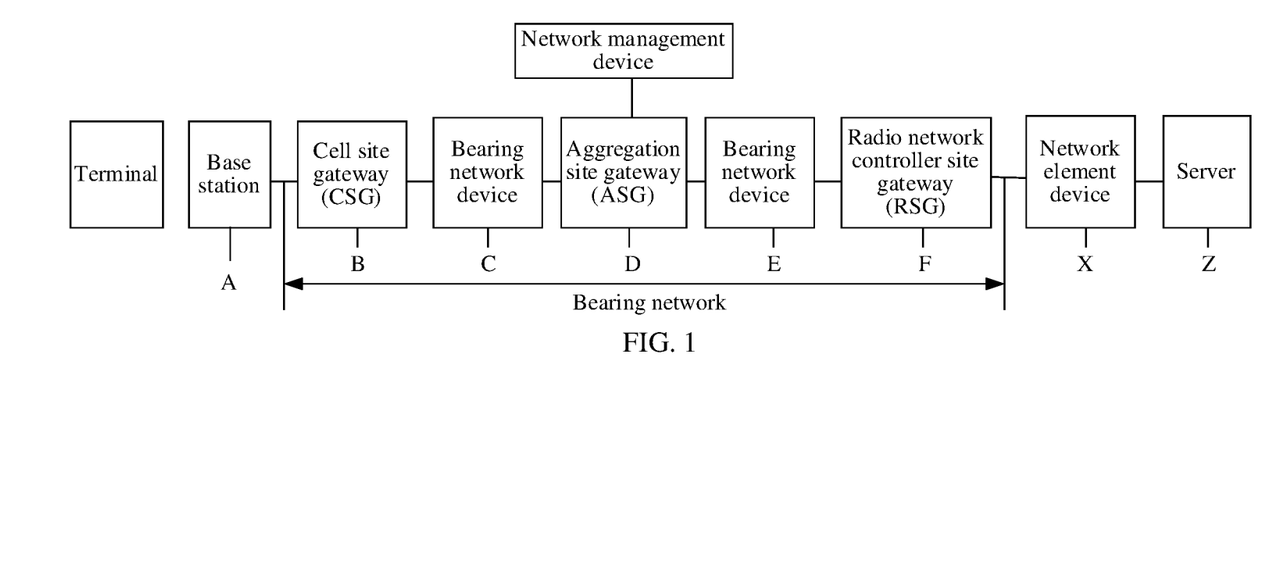
FIG. 1 is a system architecture diagram according to an embodiment of the present disclosure.

FIG. 1 is a system architecture diagram according to an embodiment of the present disclosure. A solution in this embodiment of the present disclosure may be applied to a network system shown in FIG. 1, and the network system includes a terminal, a base station A, a cell site gateway (CSG) B, bearing network devices C and E, an aggregation site gateway (ASG) D, a radio network controller site gateway (RSG) F, a network element device X, a server Z, and a network management device. For example, the network element device X may be a router device. The terminal in the present disclosure may include a handheld device, an in-vehicle device, a wearable device or a computing device that has a wireless communication function or another processing device connected to a wireless modem, and user equipment (UE) of various forms.

Figure 2:
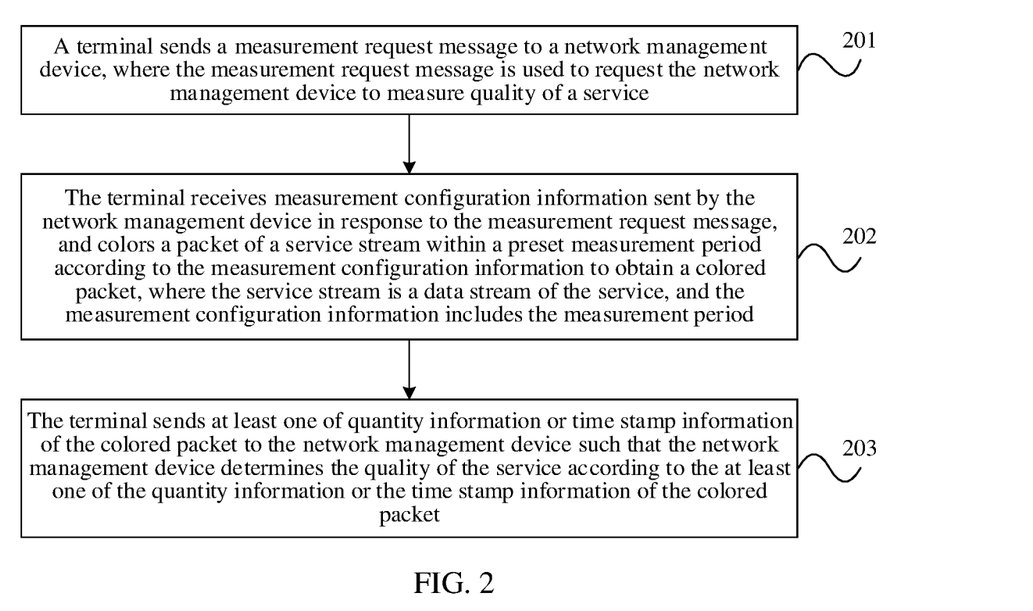
FIG. 2 is a flowchart of a method for measuring quality of a service running on a terminal according to an embodiment of the present disclosure.

FIG. 2 is a flowchart of a method for measuring quality of a service running on a terminal according to an embodiment of the present disclosure. This embodiment is executed by a terminal. As shown in FIG. 2, the method in this embodiment is used to measure quality of a service running on a terminal, and the method may include the following steps.

Step 201: The terminal sends a measurement request message to a network management device, where the measurement request message is used to request the network management device to measure the quality of the service.

Step 202: The terminal receives measurement configuration information sent by the network management device in response to the measurement request message, and colors a packet of a service stream within a preset measurement period according to the measurement configuration information to obtain a colored packet, where the service stream is a data stream of the service, and the measurement configuration information includes the measurement period.

Step 203: The terminal sends at least one of quantity information or time stamp information of the colored packet to the network management device such that the network management device determines the quality of the service according to the at least one of the quantity information or the time stamp information of the colored packet.

Further, the terminal selects a service that needs to be measured, that is, a user may select an application A to be measured in applications on the terminal. The terminal requests the network management device to initiate measurement of a service stream of the application A, that is, sends a measurement request message. The measurement request message includes 5-tuple information, that is, an IP address of the terminal, a destination IP address of the service stream, a source port of the terminal, a destination port of the service stream, and a transport-layer protocol type. The network management device determines a transmission path of the service stream according to the IP address of the terminal, the port of the terminal, the destination IP address, the destination port, and the transport-layer protocol type, and sends the measurement configuration information to each node in the transmission path. The measurement configuration information is used to indicate a rule, for example, an Access Control List (ACL) monitoring rule, under which each node in the transmission path executes measurement of the service stream of the service. In an embodiment, the measurement configuration information may include the 5-tuple information and the measurement period determined by the network management device. In an embodiment, the measurement configuration information sent to the terminal may be different from that sent to another node, that is, may have one more field used to instruct the terminal to color the packet. When the node measures the service stream according to the measurement configuration information, the 5-tuple information may be added to an ACL, and a packet of only a corresponding service stream in the ACL is measured.

The network management device needs to probe, according to the measurement request message, the transmission path of the service stream that needs to be measured. The method for probing the transmission path is as follows. The network management device sends a probe packet according to the measurement request message such that each node (a node B, a node C, a node D, a node E, a node F, and a node X that are shown in FIG. 1) in a network obtains the probe packet, and each node determines a hop count of the probe packet according to 5-tuple information of the measurement request message. The probe packet carries the 5-tuple information of the measurement request message. Each node sends respective node information and hop count information to the network management device. The network management device determines the transmission path according to the node information and the hop count information that are reported by each node. As shown in FIG. 1, the transmission path is the terminal-A-B-C-D-E-F-X-Z, and the node information may be an identifier of the node.

On the terminal, after the measurement configuration information sent by the network management device is received, the packet of the service stream of the application A is colored within a preset measurement period according to the measurement configuration information to obtain a colored packet. A quantity and time stamps of the colored packets are obtained through statistics within the measurement period, at least one of quantity information or time stamp information of the colored packet is sent to the network management device, and the colored packet is transmitted. The colored packet is sequentially received by nodes except the terminal in the transmission path, the quantity and the time stamps of the colored packets are also obtained through statistics within the measurement period, and the at least one of the quantity information or the time stamp information of the colored packet is sent to the network management device such that the network management device determines the quality, for example, a packet loss rate, a delay, and a delay variation, of the service according to the at least one of the quantity or the time stamp information of the colored packet.

Assuming that the network management device receives the quantity information of the colored packet sent by the terminal and the quantity information of the colored packet sent by another node in the transmission path, the packet loss rate may be determined according to the quantity information. Assuming that the network management device receives the time stamp information of the colored packet sent by the terminal and the time stamp information of the colored packet sent by another node in the transmission path, the delay and the delay variation may be determined according to the time stamp information.

In this embodiment, a terminal sends a measurement request message to a network management device, where the measurement request message is used to request the network management device to measure quality of service. The terminal receives measurement configuration information sent by the network management device in response to the measurement request message, and colors a packet of a service stream within a preset measurement period according to the measurement configuration information to obtain a colored packet, where the service stream is a data stream of the service, and the terminal sends at least one of quantity information or time stamp information of the colored packet to the network management device such that the network management device determines the quality of the service according to the at least one of the quantity information or time stamp information of the colored packet such that comprehensive measurement of quality of a service running on a terminal can be implemented.

The technical solution of the method embodiment shown in FIG. 2 is described below in detail using a specific embodiment.

Figure 3:
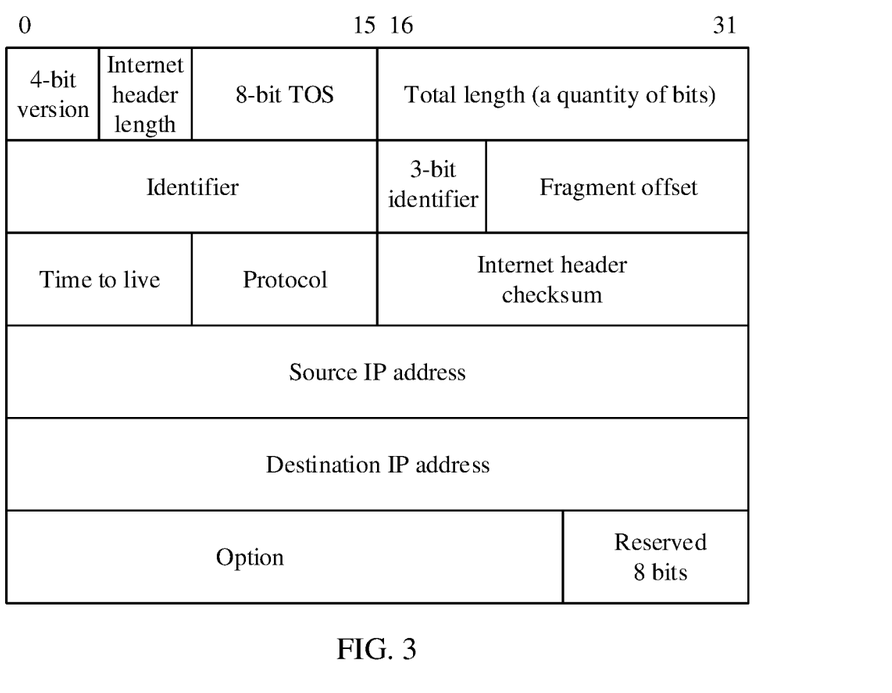
FIG. 3 is a schematic diagram of a format of a packet header according to an implementation manner of the present disclosure.

FIG. 3 is a schematic diagram of a format of a packet header according to an implementation manner of the present disclosure.

Optionally, coloring a packet of a service stream within a preset measurement period according to the measurement configuration information includes coloring the packet of the service stream within the measurement period according to a preset coloring rule, where the preset coloring rule includes coloring a bit of at least one field of a TOS field and a flag field of the packet.

Further, as shown in FIG. 3, currently, optional colored bits include some bits of a TOS field and/or one bit that has a higher order than a flag field, that is, a first bit on the left of the flag field. After the TOS field configures a differentiated service code point (DSCP) on a network element device, only two lowest-order bits are available. Coloring refers to that a feature bit in the foregoing is identified. For example, 0 or 1 is used to represent a bit.

For example, within the measurement period, a feature bit in the packet of the service stream may be identified at the terminal, and a total quantity of the packets within the measurement period is recorded. For example, a bit that has a higher order than a flag field of a packet header of a packet is set to 1, and a quantity of packets whose bits that have a higher order than the flag field of the packet header are 1 is recorded. At another node in the transmission path, a total quantity of the packets having the feature bit may be recorded. For example, the quantity of the packets having the feature bit is separately recorded at the node B, the node C, the node D, the node E, the node F, and the node X such that the quantity of the packets that have the feature bit and that are received at each node in the transmission path within the measurement period may be obtained, and finally the packet loss rate may be determined according to the quantity of the packets. Similarly, a feature bit may be used for identification, and is used to measure the delay or the delay variation of the service stream, or the like.

On a current ANDROID platform, an application programming interface (API) of a system provides an operation interface of the TOS field, the TOS field may be colored, and statistics of the colored packets is collected.

On the ANDROID platform, currently there is no API for operating the flag field, superuser (i.e., root) permissions need to be obtained if an operation is required.

In the solution of this embodiment of the present disclosure, a different colored bit represents a different measurement target. If only two bits are available, only two of the packet loss rate, the delay, or the delay variation can be measured simultaneously. That is, each colored bit may be used to measure one piece of information. For example, a single service stream needs to be measured for multiple targets such as the packet loss rate, the delay, and the delay variation, and the service stream can be measured only in a time sharing manner.

Optionally, in the method in this embodiment, the measurement request message is an IP FPM request message.

In this embodiment, for a downlink packet, the terminal receives a downlink packet sent by a last-hop node in the transmission path, and sends at least one of quantity information or time stamp information of the downlink packet to the network management device, another node in the transmission path also sends the at least one of the quantity information or the time stamp information of the downlink packet to the network management device, and the network management device determines, according to the at least one of the quantity information or the time stamp information of the downlink packet sent by each node in the transmission path, quality of a service stream corresponding to the downlink packet.

Optionally, before sending, by the terminal, a measurement request message to a network management device, the method further includes obtaining, by the terminal, a public IP address of the network management device from a DNS, where sending, by the terminal, a measurement request message to a network management device includes sending, by the terminal, the measurement request message to the network management device according to the public IP address.

Figure 4:
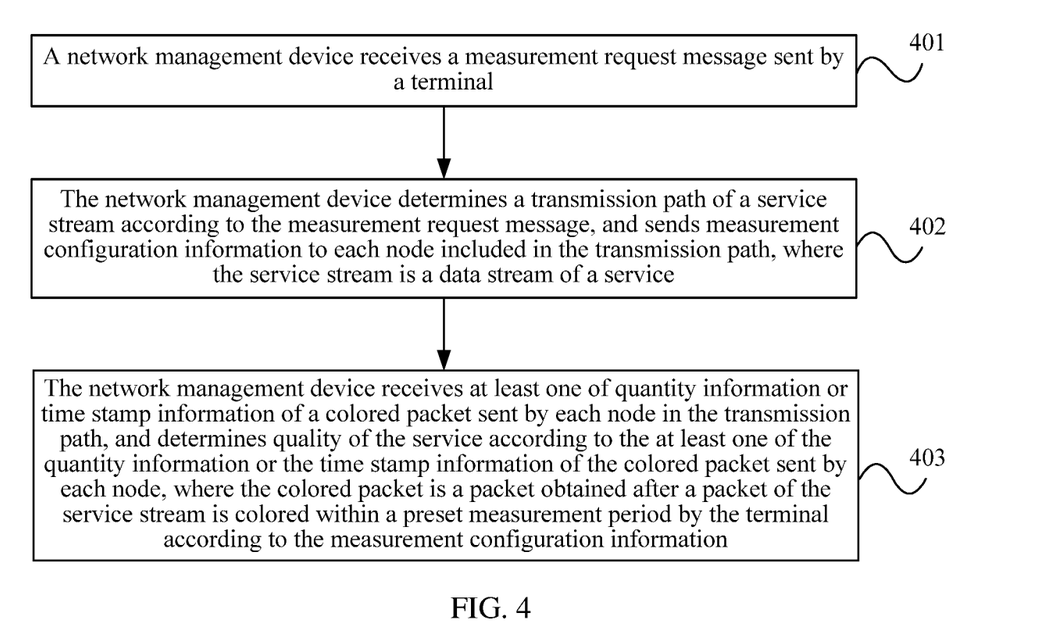
FIG. 4 is a flowchart of a method for measuring quality of a service running on a terminal according to an embodiment of the present disclosure.

FIG. 4 is a flowchart of a method for measuring quality of a service running on a terminal according to an embodiment of the present disclosure. This embodiment is executed by a network management device. As shown in FIG. 4, the method in this embodiment is used to measure quality of a service running on a terminal, and the method may include the following steps.

Step 401: The network management device receives a measurement request message sent by the terminal.

Step 402: The network management device determines a transmission path of a service stream according to the measurement request message, and sends measurement configuration information to each node included in the transmission path, where the service stream is a data stream of the service.

Step 403: The network management device receives at least one of quantity information or time stamp information of a colored packet sent by each node in the transmission path, and determines the quality of the service according to the at least one of the quantity information or the time stamp information of the colored packet sent by each node, where the colored packet is a packet obtained after a packet of the service stream is colored within a preset measurement period by the terminal according to the measurement configuration information.

The terminal selects a service that needs to be measured, that is, a user may select an application A to be measured in applications on the terminal. The terminal requests the network management device to initiate measurement of a service stream of the application A, that is, sends a measurement request message. The measurement request message includes 5-tuple information, that is, an IP address of the terminal, a destination IP address of the service stream, a source port of the terminal, a destination port of the service stream, and a transport-layer protocol type. The network management device determines a transmission path of the service stream according to the IP address of the terminal, the port of the terminal, the destination IP address, the destination port, and the transport-layer protocol type, and sends the measurement configuration information to each node in the transmission path. The measurement configuration information may include the 5-tuple information and the measurement period determined by the network management device. The measurement configuration information is used to indicate that each node in the transmission path measures the service stream of the service, that is, measurement of the service stream is configured at each node in the transmission path. The measurement configuration information sent to the terminal may be different from that sent to another node, that is, may have one more field used to instruct the terminal to color the packet. During configuration of measurement of the service stream, the 5-tuple information may be added to an ACL, and a packet of only a corresponding service stream in the ACL is measured.

The network management device needs to probe, according to the measurement request message, the transmission path of the service stream that needs to be measured. The method for probing the transmission path includes sending, by the network management device, a probe packet according to the measurement request message such that each node (a node B, a node C, a node D, a node E, a node F, and a node X that are shown in FIG. 1) in a network obtains the probe packet, and each node determines a hop count of the probe packet according to 5-tuple information of the measurement request message. The probe packet carries the 5-tuple information of the measurement request message. Each node sends respective node information and hop count information to the network management device, and the network management device determines the transmission path according to the node information and the hop count information that are reported by each node. As shown in FIG. 1, the transmission path is the terminal-A-B-C-D-E-F-X-Z, and the node information may be identifier information of the node.

On the terminal, after the measurement configuration information sent by the network management device is received, the packet of the service stream of the application A is colored within a preset measurement period according to the measurement configuration information, to obtain a colored packet. A quantity and time stamps of the colored packets are obtained through statistics within the measurement period, at least one of quantity information or time stamp information of the colored packet is sent to the network management device, and the colored packet is transmitted. The colored packet is sequentially received by nodes except the terminal in the transmission path, the quantity and the time stamps of the colored packets are also obtained through statistics within the measurement period, and the at least one of the quantity information or the time stamp information of the colored packet is sent to the network management device such that the network management device determines the quality, for example, a packet loss rate, a delay, and a delay variation, of the service according to the at least one of the quantity or the time stamp information of the colored packet.

It is assumed that the network management device receives the quantity information of the colored packet sent by the terminal and the quantity information of the colored packet sent by another node in the transmission path, the packet loss rate may be determined according to the quantity information. It is assumed that the network management device receives the time stamp information of the colored packet sent by the terminal and the time stamp information of the colored packet sent by another node in the transmission path, the delay and the delay variation may be determined according to the time stamp information.

A fault in the transmission path may be located according to the determined quality of the service. If a packet loss rate of a node is greater than a preset threshold, it can be considered that a network element of the node has a fault such that by means of the method in this embodiment of the present disclosure, a fault can be effectively located for a bearer network and a device outside the bearer network, and fast fault sectionalization can be implemented for the bearer network and a wireless network.

Optionally, determining, by the network management device, a transmission path of the service stream according to the measurement request message includes sending, by the network management device, a probe packet according to the measurement request message such that each node in a network obtains the probe packet and determines a hop count of the probe packet according to 5-tuple information of the measurement request message, where the probe packet carries the 5-tuple information of the measurement request message, and determining, by the network management device, the transmission path according to node information and hop count information that are reported by each port.

Further, the network management device sends the probe packet according to the measurement request message, where the probe packet carries the 5-tuple information of the measurement request message. Each node obtains the probe packet and determines the hop count of the probe packet according to the 5-tuple information of the measurement request message. The node information and the hop count information are sent to the network management device, and the network management device determines the transmission path according to the node information and the hop count information that are reported by the node.

Optionally, determining the quality of the service according to the at least one of the quantity information or the time stamp information of the colored packet sent by each node includes determining, according to the quantity information of the colored packet sent by each node, packet loss rate information of the colored packet at each hop in the transmission path of the service stream, or determining, according to the time stamp information of the colored packet sent by each node, delay information and/or delay variation information of the colored packet at each hop in the transmission path of the service stream.

Further, as shown in FIG. 3, if two lowest-order bits of the TOS field and a bit that has a higher order than the flag field in the packet header are all colored, one bit is used to measure the packet loss rate, one bit is used to measure the delay, and one bit is used to measure the delay variation. The packet loss rate information of the colored packet at each hop in the transmission path of the service stream is obtained according to the quantity information of the colored packet sent by the terminal and the quantity information of the colored packet sent by another node included in the transmission path (quantity information of the colored packets obtained after the terminal and the other node collect statistics of the packets having a same colored bit).

Alternatively, the delay information and/or the delay variation information of the colored packet at each hop in the transmission path of the service stream are obtained according to the time stamp information of the colored packet sent by the terminal and the time stamp information of the colored packet sent by another node in the transmission path (the terminal and the other node record the time stamp information of the packets having the same colored bit), and the time stamp information is carried in an option of the packet format in FIG. 3.

Figure 5:
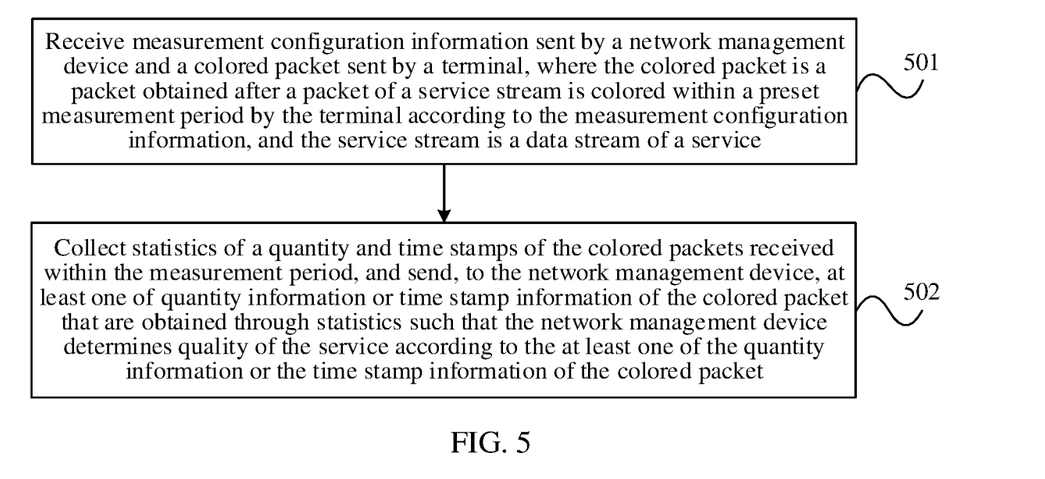
FIG. 5 is a flowchart of a method for measuring quality of a service running on a terminal according to an embodiment of the present disclosure.

FIG. 5 is a flowchart of a method for measuring quality of a service running on a terminal according to an embodiment of the present disclosure. This embodiment is executed by a network element device, and the network element device may be a bearer network device or may be a device other than the bearer network device. As shown in FIG. 5, the method in this embodiment is used to measure quality of a service running on a terminal, and the method may include the following steps.

Step 501: Receive measurement configuration information sent by a network management device and a colored packet sent by the terminal, where the colored packet is a packet obtained after a packet of a service stream is colored within a preset measurement period by the terminal according to the measurement configuration information, and the service stream is a data stream of the service.

Step 502: Collect statistics of a quantity and time stamps of the colored packets received within the measurement period, and send, to the network management device, at least one of quantity information or time stamp information of the colored packet that are obtained through statistics such that the network management device determines the quality of the service according to the at least one of the quantity information or the time stamp information of the colored packet.

Further, the network element device receives the colored packet that is transmitted by a last-hop device and that is sent by the terminal and the measurement configuration information that is sent by the network management device. The measurement configuration information includes the 5-tuple information and the measurement period, and the last-hop device is a last-hop node in the transmission path of the service stream. The quantity and the time stamps of the received colored packets are obtained through statistics within the measurement period, and the at least one of the quantity information or the time stamp information of the colored packet obtained by collecting statistics of is sent to the network management device such that the network management device determines quality information, for example, a packet loss rate, a delay, and a delay variation, of the service stream according to the at least one of the quantity information or the time stamp information of the colored packet.

The bearer network device in FIG. 1 has a same processing manner for uplink packet transmission and downlink packet transmission.

In this embodiment, for a peer-end network element device that interacts with the terminal, that is, a network element device at an entry of a downlink packet in a network, for example, the node X shown in FIG. 1, a process of processing an uplink packet is the same as the process described above, and a process of processing the downlink packet is the same as a process on a terminal side, that is, the downlink packet needs to be colored.

Figure 6:
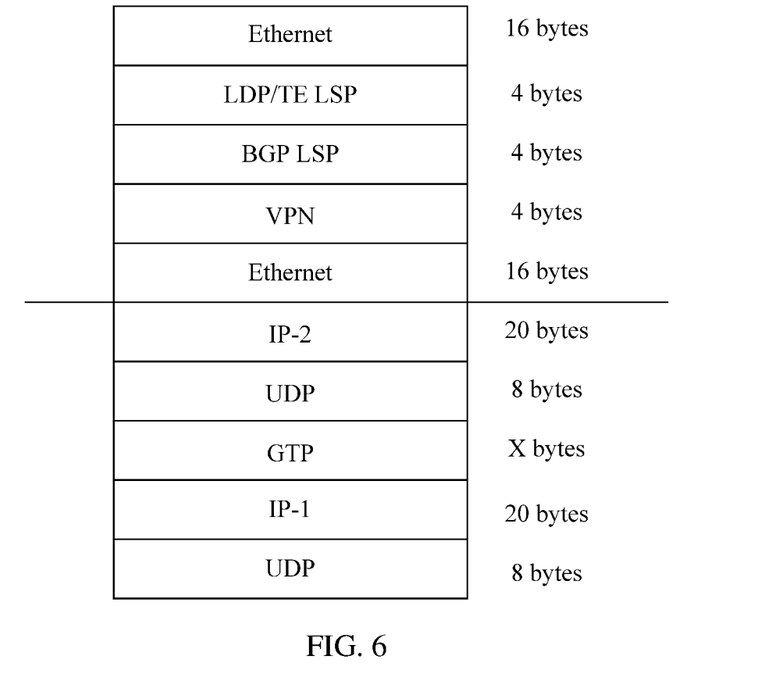
FIG. 6 is a schematic diagram of a service packet protocol stack in a bearer network tunnel according to an embodiment of the present disclosure.

FIG. 6 is a schematic diagram of a service packet protocol stack in a bearer network tunnel according to an embodiment of the present disclosure.

Optionally, before collecting statistics of a quantity and time stamps of the colored packets received within the measurement period, the method further includes determining whether the colored packet needs to be measured.

Optionally, determining whether the colored packet needs to be measured includes determining, according to the measurement configuration information, whether the colored packet needs to be measured, where the measurement configuration information includes a source IP address of the service stream, a destination IP address of the service stream, a source port of the terminal, a destination port of the service stream, and a transport-layer protocol type.

Further, it is determined whether the colored packet needs to be measured, that is, for the colored packet, at all network elements through which the colored packet flows in the transmission path, packet interception is performed, a packet offset is calculated, a source IP address and a destination IP address of the colored packet are obtained, and it is determined, according to whether the source IP address and the destination IP address are respectively the same as the source IP address of the service stream and the destination IP address of the service stream in the measurement configuration information, whether measurement needs to be performed. A specific method is as follows.

Only a bearer network device is used as an example for description. As shown in FIG. 6, a packet in IP-2 (including IP-2) is directly visible to the bearer network device. The main difficulty is that a length of a general packet radio service (GPRS) tunneling protocol (GTP) packet field is not fixed, and the length of the GTP packet field=8+N*4 (N=0, 1, 2 . . . ). The packet herein refers to that the bearer network device encapsulates an original packet again according to the tunneling protocol, where the IP-2 is an IP of the tunneling protocol, and the IP of the IP-2 corresponds to a subnet IP of the bearer network device.

A target is to find a position of a packet header of an IP-1 from a packet header of the IP-2. The IP-1 includes a source IP and a destination IP.

The solution that is used is that, three values of N are 0, 1, and 2, which are separately measured.

When N=0, based on the IP-2 packet, 20+8+8 bytes are offset, to obtain the IP-1 packet. An ACL of the IP-1 packet is matched, if a service stream matches an ACL monitoring rule of the bearer network device, the bearer network device needs to execute an IP FPM on the service stream, a specific offset 36 of the IP-2 is obtained, otherwise, the value of N continues to be changed, when N=1, as mentioned above, 20+8+8+4=40 is offset, and the subsequent step is the same, and when N=2, as mentioned above, 20+8+8+8=44 is offset, and the subsequent step is the same.

A Label Distribution Protocol (LDP)/traffic engineering (TE) label switched path (LSP), a Border Gateway Protocol (BGP) LSP, Ethernet, virtual private network (VPN), User Datagram Protocol (UDP) and the like in FIG. 6 all belong to a tunneling protocol, and after passing through the bearer network device, an original service packet is encapsulated by various tunneling protocols of the bearer network.

Figure 7:
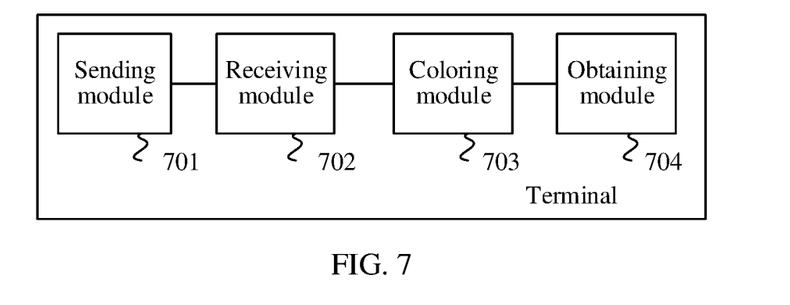
FIG. 7 is a schematic structural diagram of a terminal according to an embodiment of the present disclosure.

FIG. 7 is a schematic structural diagram of a terminal according to an embodiment of the present disclosure. As shown in FIG. 7, the terminal in this embodiment may include a sending module 701, a receiving module 702, and a coloring module 703.

The sending module 701 is configured to send a measurement request message to a network management device, where the measurement request message is used to request the network management device to measure quality of a service.

The receiving module 702 is configured to receive measurement configuration information sent by the network management device in response to the measurement request message.

The coloring module 703 is configured to color a packet of a service stream within a preset measurement period according to the measurement configuration information to obtain a colored packet, where the service stream is a data stream of the service, and the measurement configuration information includes the measurement period.

The sending module 701 is further configured to send at least one of quantity information or time stamp information of the colored packet to the network management device such that the network management device determines the quality of the service according to the at least one of the quantity information or the time stamp information of the colored packet.

Optionally, the coloring module 703 is further configured to color the packet of the service stream within the measurement period according to a preset coloring rule, where the preset coloring rule includes coloring a bit of at least one field of a TOS field and a flag field that are of the packet.

Optionally, the measurement request message is an IP FPM request message.

Optionally, the terminal further includes an obtaining module 704 configured to obtain a public IP address of the network management device from a DNS, where the sending module 701 is further configured to send the measurement request message to the network management device according to the public IP address.

According to the terminal described in the foregoing embodiment, a function of the sending module 701 of the terminal may be accomplished by a transmitter, and functions of the receiving module 702 and the obtaining module 704 of the terminal may be accomplished by a receiver, where the transmitter may be a transmit antenna, a WI-FI module, a BLUETOOTH module, or the like, and the receiver may a receive antenna, a WI-FI module, a BLUETOOTH module, or the like. A function of the coloring module 703 of the terminal may be further accomplished by a processor, where the processor may be a general-purpose processor, including a central processing unit (CPU), a network processor (NP), or the like, or may be a digital signal processor (DSP), an application-specific integrated circuit (ASIC), a field programmable gate array (FPGA) or another programmable logic device, a discrete gate or a transistor logic device, or a discrete hardware component.

The terminal in this embodiment may be used to execute the technical solution of the method embodiment shown in FIG. 2, and has implementation principles and technical effects similar to those in the method embodiment, which are not described in detail herein again.

Figure 8:
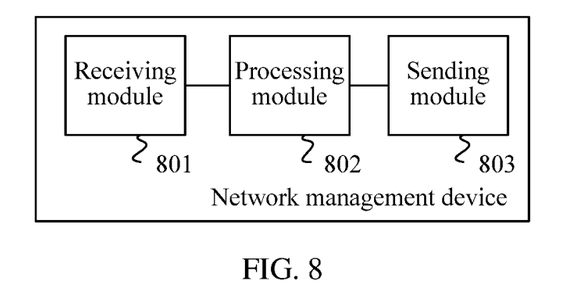
FIG. 8 is a schematic structural diagram of a network management device according to an embodiment of the present disclosure.

FIG. 8 is a schematic structural diagram of a network management device according to an embodiment of the present disclosure. As shown in FIG. 8, the network management device in this embodiment may include a receiving module 801, a processing module 802, and a sending module 803.

The receiving module 801 is configured to receive a measurement request message sent by a terminal.

The processing module 802 is configured to determine a transmission path of a service stream according to the measurement request message, where the service stream is a data stream of the service.

The sending module 803 is configured to send measurement configuration information to each node included in the transmission path.

The receiving module 801 is further configured to receive at least one of quantity information or time stamp information that are of a colored packet sent by each node in the transmission path.

The processing module 802 is further configured to determine the quality of the service according to the at least one of the quantity information or the time stamp information that are of the colored packet sent by each node, where the colored packet is a packet obtained after a packet of the service stream is colored within a preset measurement period by the terminal according to the measurement configuration information.

Optionally, the processing module 802 is further configured to send a probe packet according to the measurement request message such that each node in a network obtains the probe packet and determines a hop count of the probe packet according to 5-tuple information of the measurement request message, where the probe packet carries the 5-tuple information of the measurement request message, and determine the transmission path according to node information and hop count information that are reported by each port.

Optionally, the processing module 802 is further configured to determine, according to the quantity information of the colored packet sent by each node, packet loss rate information of the colored packet at each hop in the transmission path of the service stream, or determine, according to the time stamp information of the colored packet sent by each node, delay information and/or delay variation information of the colored packet at each hop in the transmission path of the service stream.

According to the network management device described in the foregoing embodiment, a function of the sending module 803 of the network management device may be accomplished by a transmitter, and a function of the receiving module 801 of the network management device may be further accomplished by a receiver, where the transmitter may be a transmit antenna, and the receiver may a receive antenna. A function of the processing module 802 of the network management device may be accomplished by a processor, where the processor may be a general-purpose processor, including a CPU, an NP, or the like, or may be a DSP, an ASIC, an FPGA or another programmable logic device, a discrete gate or a transistor logic device, or a discrete hardware component.

The network management device in this embodiment may be used to perform the technical solutions of the method embodiment shown in FIG. 4, and has implementation principles and technical effects similar to those of the method embodiment, and details are not described herein again.

Figure 9:
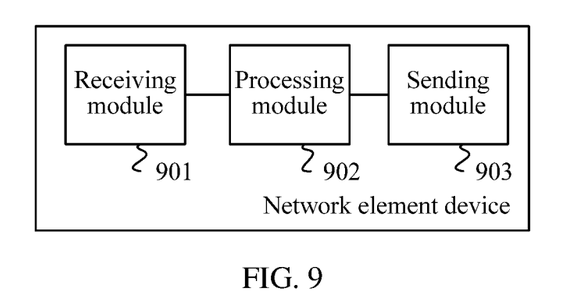
FIG. 9 is a schematic structural diagram of a network element device according to an embodiment of the present disclosure.

FIG. 9 is a schematic structural diagram of a network element device according to an embodiment of the present disclosure. As shown in FIG. 9, the network element device in this embodiment may include a receiving module 901, a processing module 902, and a sending module 903.

The receiving module 901 is configured to receive measurement configuration information sent by a network management device and a colored packet sent by the terminal, wherein the colored packet is a packet obtained after a packet of a service stream is colored within a preset measurement period by the terminal according to the measurement configuration information, and the service stream is a data stream of the service.

The processing module 902 is configured to collect statistics of a quantity and time stamps of the colored packets received within the measurement period.

The sending module 903 is configured to send, to the network management device, at least one of quantity information or time stamp information that are of the colored packet that are obtained through statistics such that the network management device determines the quality of the service according to the at least one of the quantity information or the time stamp information that are of the colored packet.

According to the network element device described in the foregoing embodiment, according to the network management device described in the foregoing embodiment, a function of the sending module 903 of the network element device may be accomplished by a transmitter, and a function of the receiving module 901 of the network element device may be further accomplished by a receiver, where the transmitter may be a transmit antenna, and the receiver may a receive antenna. A function of the determining module of the network element device may be further accomplished by a processor, where the processor may be a general-purpose processor, including a CPU, an NP, or the like, or may be a DSP, an ASIC, an FPGA or another programmable logic device, a discrete gate or a transistor logic device, or a discrete hardware component.

The network element device in this embodiment may be used to perform the technical solutions of the method embodiment shown in FIG. 5, and has implementation principles and technical effects similar to those in the method embodiment, and details are not described herein again.

A system for measuring quality of a service in an embodiment of the present disclosure includes a terminal, a network management device, and a network element device. The terminal may use the structure of the terminal shown in FIG. 7. Correspondingly, the terminal may execute the technical solution of any method embodiment in FIG. 2, and has implementation principles and technical effects similar to those in the any method embodiment, which are not described in detail herein again. The network management device may use the structure of the network management device shown in FIG. 8. Correspondingly, the network management device may execute the technical solution of any method embodiment in FIG. 4, and has implementation principles and technical effects similar to those shown in the any method embodiment, which are not described in detail herein again. The network element device may use the structure of the network element device shown in FIG. 9. Correspondingly, the network element device may execute the technical solution of the any method embodiment shown in FIG. 5, and has implementation principles and technical effects similar to those in the any method embodiment, which are not described in detail herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method, comprising:
    sending, by a terminal, a measurement request message to a network management device, wherein the measurement request message requests the network management device to measure a quality of a service;
    receiving, by the terminal, measurement configuration information from the network management device in response to the measurement request message;
    coloring, by the terminal, a packet of a service stream within a preset measurement period according to the measurement configuration information to obtain a colored packet, wherein the service stream comprises a data stream of the service, and wherein the measurement configuration information comprises the preset measurement period; and sending, by the terminal, at least one of quantity information or time stamp information of the colored packet to the network management device.

2. The method according to claim 1, wherein coloring the packet of the service stream within the preset measurement period comprises coloring the packet of the service stream within the preset measurement period according to a preset coloring rule, and wherein the preset coloring rule comprises coloring a bit of at least one of a type of service (TOS) field or a flag field of the packet.

3. The method according to claim 1, wherein the measurement request message comprises an Internet Protocol (IP) flow performance measurement (FPM) request message.

4. The method according to claim 1, wherein before sending the measurement request message to the network management device, the method further comprises obtaining, by the terminal, a public Internet Protocol (IP) address of the network management device from a domain name server (DNS), and wherein sending the measurement request message to the network management device comprises sending, by the terminal, the measurement request message to the network management device according to the public IP address.

5. The method according to claim 1, further comprising:
receiving the measurement configuration information from the network management device, wherein the colored packet is obtained after the packet of the service stream is colored within the preset measurement period by the terminal according to the measurement configuration information, and wherein the service stream comprises the data stream of the service;
collecting statistics of a quantity and time stamps of colored packets received within the preset measurement period; and
sending, to the network management device, the quantity of the colored packets obtained through the statistics.

6. The method according to claim 1, further comprising:
receiving the measurement configuration information from the network management device, wherein the colored packet is obtained after the packet of the service stream is colored within the preset measurement period by the terminal according to the measurement configuration information, and wherein the service stream comprises the data stream of the service;
collecting statistics of a quantity and time stamps of colored packets received within the preset measurement period; and
sending, to the network management device, the time stamps information of the colored packets obtained through the statistics.

7. A terminal, comprising:
a transmitter configured to send a measurement request message to a network management device, wherein the measurement request message requests the network management device to measure a quality of a service;
a receiver configured to receive measurement configuration information from the network management device in response to the measurement request message; and
a processor coupled to the transmitter and the receiver and configured to color a packet of a service stream within a preset measurement period according to the measurement configuration information to obtain a colored packet,
wherein the service stream comprises a data stream of the service,
wherein the measurement configuration information comprises the preset measurement period, and
wherein the transmitter is further configured to send at least one of quantity information or time stamp information of the colored packet to the network management device.

8. The terminal according to claim 7, wherein the processor is further configured to color the packet of the service stream within the preset measurement period according to a preset coloring rule, and wherein the preset coloring rule comprises coloring a bit of at least one of a type of service (TOS) field or a flag field of the packet.

9. The terminal according to claim 7, wherein the measurement request message comprises an Internet Protocol (IP) flow performance measurement (FPM) request message.

10. The terminal according to claim 7, wherein the processor is further configured to obtain a public Internet Protocol (IP) address of the network management device from a domain name server (DNS), and wherein the transmitter is further configured to send the measurement request message to the network management device according to the public IP address.

11. The terminal according to claim 7, wherein the receiver is further configured to receive the measurement configuration information from the network management device, wherein the colored packet is obtained after the packet of the service stream is colored within the preset measurement period by the terminal according to the measurement configuration information, wherein the service stream comprises the data stream of the service, wherein the processor is further configured to collect statistics of a quantity and time stamps of colored packets received within the preset measurement period, and wherein the transmitter is further configured to send, to the network management device, the quantity of the colored packet obtained through the statistics.

12. The terminal according to claim 7, wherein the receiver is further configured to receive the measurement configuration information from the network management device, wherein the colored packet is obtained after the packet of the service stream is colored within the preset measurement period by the terminal according to the measurement configuration information, wherein the service stream comprises the data stream of the service, wherein the processor is further configured to collect statistics of a quantity and time stamps of colored packets received within the preset measurement period, and wherein the transmitter is further configured to send, to the network management device, the time stamps of the colored packets obtained through the statistics.

* * * * *

UNITED STATES PATENT AND TRADEMARK OFFICE
CERTIFICATE OF CORRECTION

PATENT NO. : 10,547,504 B2
APPLICATION NO. : 15/858222
DATED : January 28, 2020
INVENTOR(S) : Yining Wang, Cheng Cao and Zhiwei Ma It is certified that error appears in the above-identified patent and that said Letters Patent is hereby corrected as shown below:

On the Title Page

Foreign Application Priority: "2015 1 0386057" should read "2015 1 0386057.4"

Page 2, Other Publications, 2nd Column, Line 14: "Translation and Abstract" should read "Machine Translation and Abstract"

Page 2, Other Publications, 2nd Column, Line 18: "Translation and Abstract" should read "Machine Translation and Abstract"

In the Claims

Claim 6, Column 17, Line 55: "stamps information of the colored packets" should read "stamps of the colored packets"

Claim 11, Column 18, Line 46: "colored packet obtained" should read "colored packets obtained"

Signed and Sealed this
Seventeenth Day of March, 2020

Andrei Iancu
*Director of the United States Patent and Trademark Office*